Sept. 25, 1945.   H. I. WOLFF   2,385,483
RECOVERY AND PURIFICATION OF IODINE
Filed Oct. 28, 1942
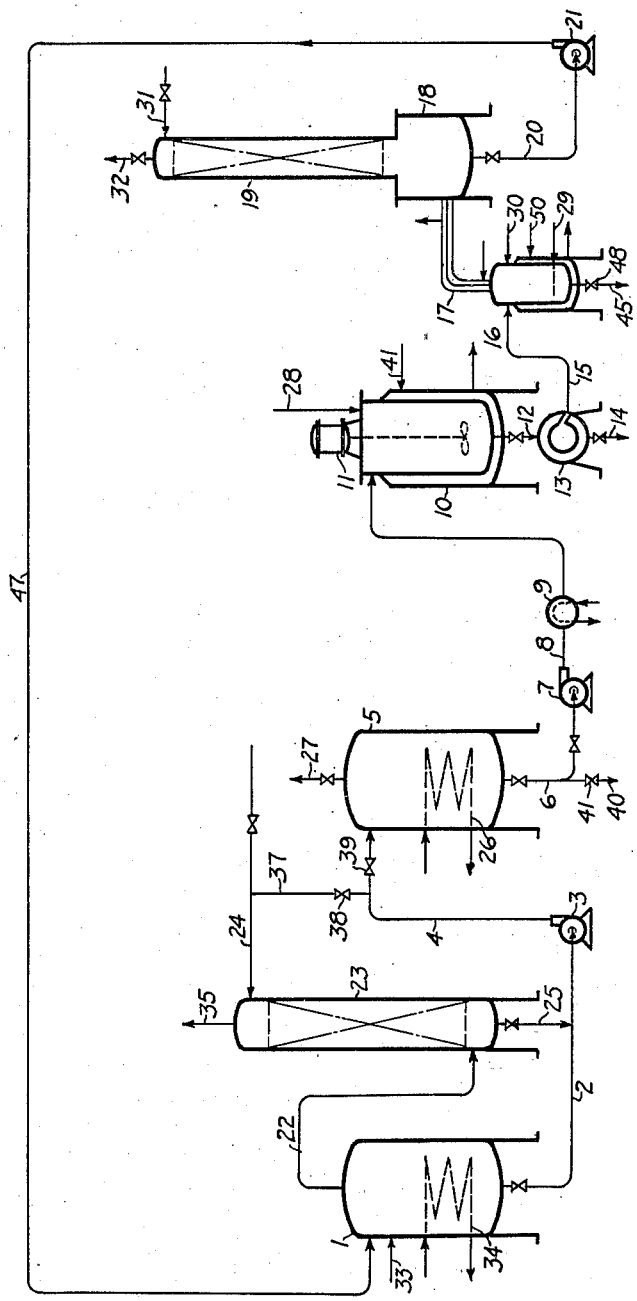
Inventor: Harold I. Wolff
By his Attorney: H. Birch Patented Sept. 25, 1945

2,385,483

UNITED STATES PATENT OFFICE 2,385,483

RECOVERY AND PURIFICATION OF IODINE

Harold I. Wolff, San Francisco, Calif., assignor to Shell Development Company, San Francisco, Calif., a corporation of Delaware Application October 28, 1942, Serial No. 463,716

5 Claims. (Cl. 23—216)

The present invention relates to the recovery and purification of iodine and more specifically to the recovery, reconcentration and removal of organic impurities from iodine which has been used as a catalyst in the formation of polyolefinic compounds by dehydration of polyhydroxy compounds.

Briefly, the process of the present invention is executed by hydrolyzing organic iodides, oxidizing the iodine salts thus formed to precipitate an iodine crystal slurry and finally dehydrating and vaporizing the crude iodine concentrate under controlled conditions to produce substantially pure, concentrated iodine.

It has been common practice in the past to purify crude iodine either by sublimation or, alternatively, by heating under a covering agent such as sulfuric acid (as described in U. S. Patent 1,857,632) and thereafter permitting the iodine to crystallize at a lower temperature. The sublimation method, however, has the disadvantage that volatile impurities may be likely to pass over into the condenser with the iodine and thus contaminate the supposedly purified product. The process described in the above patent, on the other hand, has the disadvantage that the iodine, after removal of the impurities and crystallization, must be further processed by washing and drying in order to remove remaining sulfuric acid and water.

According to the present invention these disadvantages may be overcome and elemental iodine produced in a form suitable for immediate reuse without further processing. Essentially the present invention comprises treating a solution containing iodine which is contaminated with organic and/or inorganic compounds, such as organic diiodides, and other impurities with a hydrolyzing agent, such as sodium hydroxide, to produce a solution containing sodium iodide and substantially free of organic compounds. The sodium iodide solution is then treated with an oxidizing agent, such as a chromic-sulfuric acid solution to produce an iodine crystal slurry which is filtered. The crude iodine crystals recovered from the filtration operation are then dehydrated and vaporized under controlled conditions to remove water, as will be described in detail below, to produce high purity, elemental iodine.

For purposes of illustration, the iodine recovery and purification process will be described as applied to the production of dienes from glycols wherein iodine is utilized as a dehydration catalyst. It is to be understood, however, that the process is equally suitable for recovering and purifying crude iodine derived from any suitable source and particularly crude iodine which is contaminated with organic iodide compounds.

The advantage to be derived in operating according to the present invention will become apparent in the following detailed description thereof, reference also being had to the accompanying flow diagram which forms a part of this specification and illustrates a preferred embodiment of the invention.

In the diagram, diacetone glycol and iodine are heated in vessel 1 by means of steam coil 34 to a temperature of the order of 270° F. whereupon dehydration of the glycol to form methyl pentadiene takes place. The pentadiene, as well as water and a small amount of hydrogen iodide, is vaporized and passes out of vessel 1 through conduit 22 and into a packed tower 23 wherein they are countercurrently scrubbed by a sodium hydroxide solution which enters through conduit 24. In this manner the hydrogen iodide is converted to sodium iodide and passes into conduit 2 through conduit 25 along with unreacted sodium hydroxide solution. Water and methyl pentadiene are taken overhead from tower 23 through conduit 35 and the water separated from the pentadiene by condensation.

The material remaining in vessel 1 after the dehydration, which consists essentially of organic polymers and iodides, is passed through conduit 2, pump 3 and conduit 4 to vessel 5. The mixture of bottoms products from vessel 1 and sodium hydroxide-sodium iodide solution from vessel 23 are maintained at a temperature of the order of 225° F. in vessel 5 by means of steam coil 26, resulting in the hydrolysis of the bottoms products to form primarily sodium iodide, water and light organic compounds such as dienes, alcohols and ethers. These light products are taken overhead with some water through conduit 27, the sodium iodide solution and unreacted organic polymers separating to form two liquid phases. The sodium iodide solution is withdrawn from vessel 5 through conduit 6, pump 7, conduit 8 and cooler 9 to a jacketed vessel 10, which is maintained at a temperature of about 120° F. by means of cooling water supplied through conduit 41. Conduit 8 is provided with a cooling coil 9 in order to reduce the temperature of the sodium iodide solution leaving vessel 5.

After withdrawal of the sodium iodide solution from vessel 5, valve 41 may be opened and the remaining heavy organic compounds drained from the vessel through conduit 40. During the period of the dehydration cycle in vessel 1, valve 38 is open and valve 39 closed. In this manner sodium hydroxide solution is constantly recirculated through vessel 23 via conduits 25 and 2, pump 3 and conduits 4, 37 and 24. After the dehydration cycle has been completed, valve 38 is closed and valve 39 opened, sodium hydroxide solution thus being passed through conduit 24 from a source of supply (not shown), vessel 23, conduit 25 and into conduit 2 along with the bottoms products from vessel 1. As has been described above, these materials are then passed through pump 3 and conduit 4 to vessel 5.

A 5% weight solution of sodium bichromate in concentrated (95%) sulfuric acid is passed into vessel 10 through conduit 28 and mixed with the sodium iodide solution therein by means of mixer 11, the temperature within vessel 10 being maintained at about 120° F. The resulting oxidation reaction produces a slurry or suspension comprising iodine crystals and sodium chromate-sulfuric acid solution. This slurry is passed through conduit 12 to filter 13 from whence the filtrate comprising essentially sodium chromate and sulfuric acid containing unreacted sodium bichromate in solution is passed through conduit 14 and out of the system. The filter cake, which comprises crude iodine crystals and a dilute solution of entrained oxidizing agent including a small amount of the salt formed in vessel 10, is transferred to jacketed vessel 16 either manually or by means of a screw conveyor or the like at 15. A quantity of concentrated (not exceeding 98% by weight $H_2SO_4$) sulfuric acid is introduced to vessel 16 through conduit 36. For normal operation the quantity of sulfuric acid should be between approximately one and two times the weight of the filter cake. Steam is then introduced to the jacket of vessel 16 through conduit 50 until the temperature of the contents of the vessel is approximately 240° F. At this temperature there will normally be two liquid phases within the vessel, a lower phase comprising iodine (which melts at 237.2° F.) and an upper phase comprising sulfuric acid. If desired, however, the temperature in vessel 16 may be maintained as low as 200° F., in which instance, a slurry of iodine crystals in sulfuric acid will be present in the vessel.

A non-aqueous inert gas stream, comprising methane, nitrogen, flue gases or the like, is then introduced to vessel 16 by means of conduit 29, resulting in vaporization of the iodine which passes out of the vessel with the inert gas stream through conduit 17 which is steam jacketed and maintained at a temperature at least equivalent to that maintained in vessel 16 and preferably at least at the melting point temperature of iodine. It is to be emphasized that according to the present invention the iodine is vaporized from vessel 16 as distinguished from distillation. In this manner the entire process may be operated at temperatures below the boiling point of iodine (361.4° F.) and contamination of the purified iodine with water vapor or sulfuric acid is avoided. As a matter of practical procedure, the vaporization should not be carried out at temperatures substantially exceeding 270° F. Above this temperature substantial vaporization of water from a 90% $H_2SO_4$ solution will begin to take place, resulting in contamination of the vaporized iodine with water vapor. Preferably, the vaporization is carried out at approximately the melting point of iodine for optimum operating efficiency, i. e. between approximately 232° F. and 242° F.

The sulfuric acid in vessel 16 may be used until the concentration falls to approximately 90% $H_2SO_4$, at which time it should be withdrawn through conduit 45 and treated for removal of the small quantities of organic and inorganic impurities retained therein and reconcentrated to 98% $H_2SO_4$.

Iodine vapor and inert gas passes from conduit 17 into vessel 18 which contains diacetone glycol, substantially all of the iodine vapor becoming dissolved therein, the inert gas passing upwards through a packed tower 19. Diacetone glycol is introduced in the top of tower 19 through conduit 31 and is passed downwardly through the tower, serving to countercurrently scrub the inert gas and remove the last traces of iodine therefrom. The inert gas finally exits through conduit 32. Diacetone glycol containing dissolved iodine is passed from vessel 18 through conduit 20, pump 21 and conduit 47 to vessel 1, wherein further quantities of diacetone glycol are added through conduit 33.

Precautions should be taken to provide equipment for the various parts of the apparatus which will not be affected by the materials present. For example, reactor vessel 1, oxidation vessel 10 and dehydration vessel 16 are preferably of the glass or enamel lined type. Hydrolization vessel 5, on the other hand, may be formed of a corrosion resistant steel.

Although the various reagents noted in the above specific description of the invention are preferred, other materials are also suitable for these purposes and may be substituted if desired. For example, as hydrolyzing agents most of the carbonates and hydroxides of potassium, sodium, calcium and magnesium may be utilized. Most of the strong, acidic oxidizing agents may be used in the oxidation and precipitation step, as for example chlorine, chlorates, bromine and nitrous acid, as well as sodium and potassium bichromates in suitable acid solutions.

If desired the iodine vapor passing from vessel 16 through conduit 17 may be passed to a suitable condenser system in the known manner and the iodine collected in crystalline form. A nearly quantitative yield of the iodine present in vessel 16 should be obtained. Under optimum conditions a yield of the order of 99% or greater of iodine having a purity of 99% or greater will be realized.

I claim as my invention:

1. In a method of concentrating and purifying iodine content in solutions which are contaminated with impurities, the steps comprising contacting said impurity-containing iodine with an alkaline hydrolyzing agent to form an iodide salt of the hydrolyzing agent, subjecting said iodide salt to the action of a strong oxidizing agent to form a crude iodine concentrate, separating said iodine concentrate from said oxidizing agent, passing a non-aqueous inert gas through and vaporizing said iodine concentrate in the presence of concentrated sulfuric acid at a temperature below the vaporiation temperature of said sulfuric acid and collecting said vaporized iodine.

2. In a method of concentrating and purifying iodine used as a catalyst in the dehydration of polyhydroxy compounds, the steps comprising contacting spent iodine catalyst with an alkaline hydrolyzing agent to form an iodide salt of the hydrolyzing agent, subjecting said iodide salt to the action of a strong oxidizing agent to form a crude iodine concentrate, separating said iodine concentrate from said oxidizing agent, passing a non-aqueous inert gas through and vaporizing said iodine concentrate in the presence of concentrated sulfuric acid at a temperature below the vaporization temperature of said sulfuric acid and collecting said vaporized iodine.

3. In a method of concentrating and purifying iodine used as a catalyst in the dehydration of polyhydroxy compounds, the steps comprising contacting spent iodine catalyst with an alkaline hydrolyzing agent to form an iodide salt of the hydrolyzing agent, subjecting said iodide salt to the action of a strong oxidizing agent to form a crude iodine concentrate, separating said iodine concentrate from said oxidizing agent, passing a non-aqueous inert gas through and vaporizing said iodine concentrate in the presence of concentrated sulfuric acid at a temperature of at least approximately 200° F. and below the vaporization temperature of said concentrated sulfuric acid and absorbing said vaporized iodine in a polyhydroxy compound.

4. In a method of concentrating and purifying iodine used as a catalyst in the dehydration of polyhydroxy compounds, the steps comprising contacting spent iodine catalyst with an alkaline hydrolyzing agent to form an iodide salt of the hydrolyzing agent, subjecting said iodide salt to the action of a strong oxidizing agent to form a crude iodine concentrate, separating said iodine concentrate from said oxidizing agent, passing a non-aqueous inert gas through and vaporizing said iodine concentrate in the presence of concentrated sulfuric acid, said sulfuric acid having a vaporization temperature in excess of approximately 242° F., said vaporization being carried out at temperatures between approximately 232° F. and 242° F., and absorbing said vaporized iodine in a polyhydroxy compound.

5. In a method of concentrating and purifying iodine used as a catalyst in the dehydration of polyhydroxy compounds, the steps comprising contacting spent iodine catalyst with a solution of sodium hydroxide to form a sodium iodide solution, oxidizing said sodium iodide solution with an oxidizing agent to form a crude iodine concentrate, said oxidizing agent comprising sodium bichromate in an acid medium, separating said crude iodine concentrate from said oxidizing agent, passing a non-aqueous inert gas through and vaporizing said crude iodine concentrate in the presence of sulfuric acid having a concentration between approximately 90% and 98% and absorbing said vaporized iodine in a polyhydroxy compound, said vaporization being carried out at a temperature between approximately 200° F. and 270° F.

HAROLD I. WOLFF.